Patented Aug. 11, 1936

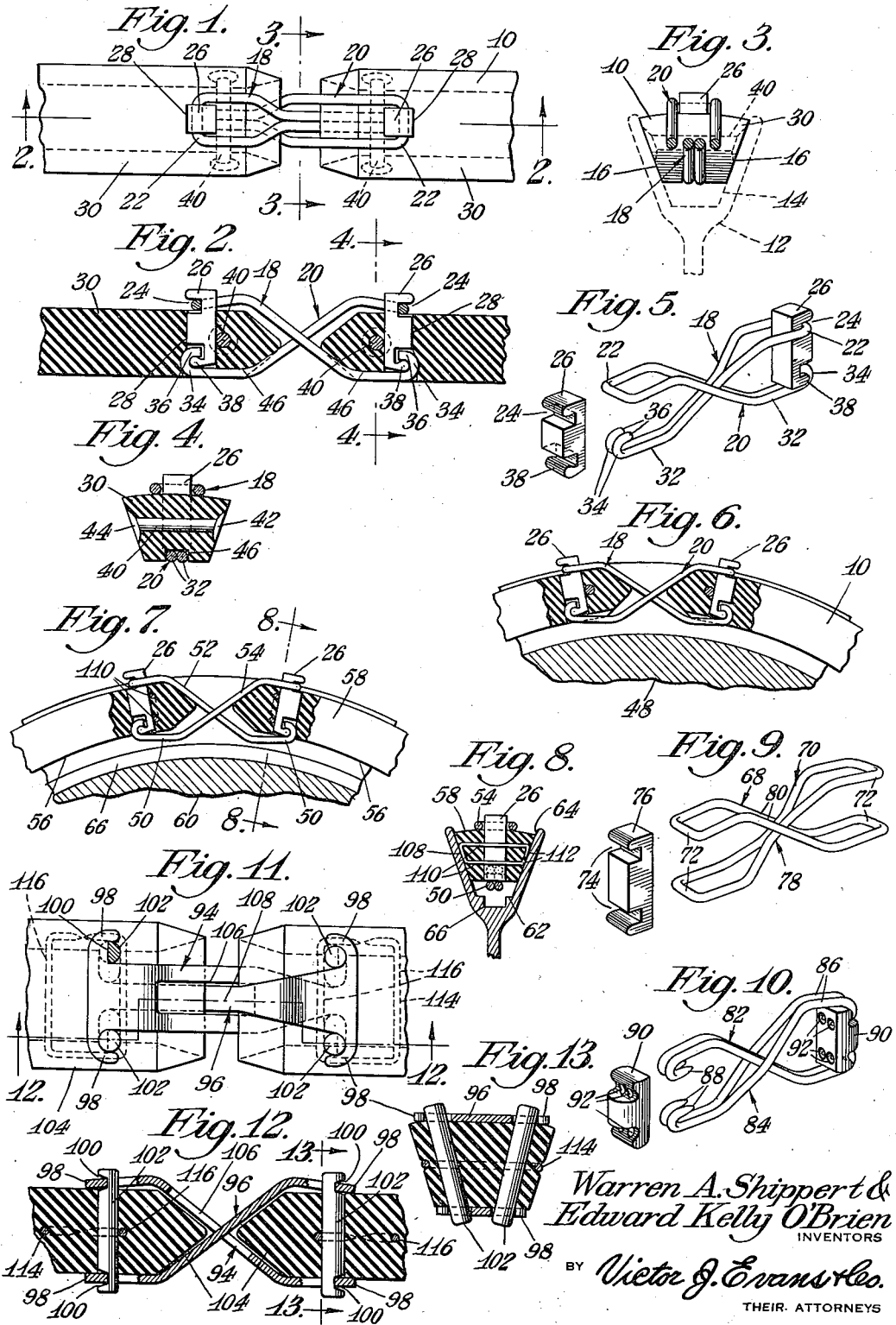

2,050,899

UNITED STATES PATENT OFFICE 2,050,899

BELT CONNECTER

Warren A. Shippert, Dixon, and Edward Kelly O'Brien, Chicago, Ill.

Application April 24, 1934, Serial No. 722,200

18 Claims. (Cl. 24—33)

Our invention relates to the art of power transmission belts, and has among its objects and advantages the provision of an improved belt connecter particularly designed for effectively connecting the ends of trapezoidal belts to provide for continuity thereof.

In the accompanying drawing:

Fig. 1 is a top plan view of the invention;

Fig. 2 is a sectional view taken along the line 2—2 of Fig. 1;

Fig. 3 is a view taken along the line 3—3 of Fig. 1;

Fig. 4 is a sectional view taken along the line 4—4 of Fig. 2;

Fig. 5 is a perspective view of the connecter per se;

Fig. 6 is a fragmentary sectional view of a belt and its associated pulley illustrating the operation of the connecter;

Fig. 7 is a view illustrating a different connecter;

Fig. 8 is a view taken along the line 8—8 of Fig. 7;

Fig. 9 is a perspective view of a different type of connecter;

Fig. 10 is a perspective view of another form of connecter;

Fig. 11 is a top plan view of a belt embodying a further modification;

Fig. 12 is a sectional view taken along the line 12—12 of Fig. 11; and

Fig. 13 is a sectional view taken along the line 13—13 of Fig. 12.

In the embodiment selected to illustrate our invention, we make use of a belt 10 of trapezoidal configuration in cross section, generally known in the trade as a V-type. This belt is associated with the usual sheave 12 provided with a V-groove 14 in the periphery thereof. In this assembled relation, the converging sides 16 of the belt are arranged in wedging relation with the sides of the groove 14. The structure so far described is old.

Our invention comprises the provision of a novel connecter whereby belts of the V-type may be effectively connected. So far as we are aware, no successful connecter has been devised for belts of this type. The conventional practice is to employ endless belts usually arranged in group relation to perform the function of a single transmission unit. In connection with belts of the endless type, it is essential that the drive and driven pulleys be adjustable toward and away from each other to permit placement and removal of the belt elements. Furthermore, it is necessary that the sheaves be accessible in a way that will permit the belt elements to be slipped over one end of each of the sheaves. Thus, belts of the endless type have a limited application in that they cannot be associated with line shafts or other constructions in which at least one end of both pulleys is not available. In other words, it will be necessary to disassemble the shaft and hanger mounting to accommodate belts of the endless type in all cases where the sheave shafts extend beyond the sheaves and are supported within bearings located on each side of the sheaves.

Our connecter comprises two link parts 18 and 20, each made up of an individual piece of wire bent at 22 to provide a loop arranged to be positioned within a recess 24 in an anchor member 26. The anchor members 26 are positioned within openings 28 in the ends 30 of the belt 10.

Referring to Figs. 1 and 5, the branches 32 of each link are brought into juxtaposed relation and have their ends bent back at 34 to provide grip members 36 in the nature of a half circle arranged to receive the rib 38 formed at the opposite ends of the anchor members 26. In Figs. 1 and 5, we illustrate the branches 32 of the link 18 as passing between the branches 32 of the link 20. This arrangement permits the anchor members 26 to pass through the belt ends 30 at points midway between the sides of the belt. This feature provides a balanced pull upon the ends of the belt.

A pin 40 is passed through each of the belt ends 30 in the plane of the neutral axis of the belt and at right angles to its associated anchor member 26. These pins are arranged in contact with the anchor members and have their ends enlarged and riveted as indicated at 42 and 44, respectively. The end enlargements are sufficiently depressed within the diverging sides 16 of the belt to bring them out of actual contact with the walls of the groove 14, while the coupler is passing around the sheaves. Similarly, the inner side of the belt ends 30 is cut away at 46 to house the branches 32 of the links, thereby preventing actual contact between the links and the bottom of the groove in cases where the belt might ride low within the groove. The pins 40 function as means for binding the ends 30 together and prevent spreading of the ends by reason of any pull exerted upon the anchor members 26. In addition, the pins provide abutments for the anchor members in the nature of fulcrums, tending to distribute forces applied to the pins throughout the full width of the belt ends.

In Fig. 6, we illustrate the manner in which our coupler operates while it is passing around the sheave 48. It will be noted, in referring to Fig. 2, that the anchor members 26 are arranged in parallel relation at right angles to the inner and outer surfaces of the belt. Fig. 2 illustrates the arrangement of the parts when the connecter comprises a part of one of the straight reaches of the belt between the contact points of the two sheaves with which the belt may be associated.

On any V-belt drive it is of primary importance that the belt flex readily around the sheaves and that the diverging side surfaces 16 have uniform relation with the sides of the groove 14 to assure an effective wedging tractive action between the belt and the sheaves. When a section of V-belt is bent to conform to the curvature of its associated sheave, the length of the inside surface of the curved portion will be shorter than the outside surface of the same portion. Of course, there is a plane positioned somewhere between the inside and outside surfaces which does not change in length when the belt part is passing from the straight to the curved portion. This plane might be called the neutral axis of the belt. In other words, the outside surface of the curved portion is placed under a tension tending to stretch the outer part of the belt, while the inner part is placed under compression tending to shorten the inner portion. This variable condition must be considered in connection with the connecter to assure an ideal operating condition.

Referring to Fig. 6, it will be noted that the alignment of the anchor members 26 has changed from one of parallelism to a converging relation corresponding to the radial axis of the sheave at the points defined by the position of the members 26. However, the anchor members retain substantially their original position with respect to the belt proper. Our connecter embodies compensation for the variable conditions that occur as the belt passes from its straight reach to the curved one, and vice versa. In other words, the crossed relation of the links 18 and 20, when viewed according to Figs. 2 and 6, provides an arrangement in which any separation between the outer ends of the anchor members 26 is equally balanced by the moving together of the inner ends of the members. This compensating function of the links 18 and 20 in association with the anchor members 26 makes the connecter highly flexible and provides an arrangement which permits natural bending of the belt.

Furthermore, the compensating action of the linkage tends to equalize the strain upon the belt ends, in that the members 26 maintain the same relative position with respect to their respective belt ends at all times. In other words, the coupler does not operate to localize shifted forces tending to disrupt the belt when the coupler is passing from the curved or straight phase of its travel. The extreme flexibility of our connecter provides a construction in which free action is attained between the belt and the sheave so that we have completely eliminated the element of vibration common to belt fasteners of conventional design.

In this connection, the forces applied to the belt through the medium of our connecter under tension remain the same regardless of whether any belt reach is in its straight or curved phase. We have arranged the loop part of the links 18 and 20 within their respective recesses 24, and the grip members 36 with respect to their respective ribs 38, in such a manner that free and easy pivotal action is attained. Thus, the connecter is highly sensitive to any variation in the relative relation between the anchor members 26 due to elongation or compression forces occurring in the inner or outer regions of the belt proper.

In Figs. 7 and 8, we illustrate a construction similar to that previously described with the exception that the branches 50 of the links 52 and 54 are arranged outside the inner surface 56 of the belt 58. Our linkage operates in the same manner as the device previously disclosed. However, we provide a specially constructed sheave 60 in that the bottom 62 of the groove 64 is grooved at 66 to accommodate the branches 50 should the belt 58 tend to ride low within the groove 64. This construction prevents metal-to-metal contact, even though the inner surface 56 should substantially contact with the bottom 62 of the groove.

Fig. 9 illustrates a construction in which the links 68 and 70 comprise crossed wire rings shaped to provide loop ends 72 for association with the recessed ends 74 of the anchor members 76. The link 70 is pressed together at 78 to provide a narrow construction operating between the reaches 80 of the link 68.

Referring to Fig. 10, we illustrate a construction in which the links 82 and 84 each comprises two pieces of wire 86. Each wire is bent back upon itself to provide a tapered hook 88 arranged within openings 90 in the anchor members 92. The tapered construction provides freedom of action for the hooks.

A further modification is illustrated in Figs. 11, 12, and 13, in which the links 94 and 96 comprise sheet material shaped to provide two hooks 98 at each end for connection with the recessed ends 100 of the anchor members 102. It will be noted that two anchor members 102 are associated with each of the belt ends 104. The anchor members are arranged in diverging relation, as illustrated in Fig. 13.

Referring to Fig. 11, the link 94 is cut away at 106 to receive the narrow part 108 of the link 96. The anchor members 102 associated with one of the belt ends 104 are spaced the same distance apart as the anchor members associated with the other belt end 104, so that a balanced condition is attained in the same way as with the single anchor member previously described. The double anchor member construction is particularly adapted to belts of relatively wide width.

In Figs. 7 and 8, we illustrate a staple 108 having its two legs 110 driven through the belt and their ends 112 clinched. This staple functions substantially in the same way as the rivet 40. It will be noted that no part of the staple extends beyond the converging sides of the belt. Similarly, the construction illustrated in Figs. 11, 12, and 13, is provided with a staple 114 of the same type as the staple 108, but arranged differently in that its legs 116 are driven through the belt at its approximate neutral axis.

All the forms embody a construction which provides a strain equalizing function. Our coupler permits V-belts to be effectively connected, thereby extending the range of the useful application of belts of this type. In addition, the linkage is exceedingly sensitive and operates to permit free flexing and movement of the belt in response to the various forces acting thereon. Our construction has the same tensional relation with the belt ends regardless of whether the coupler is considered in connection with the straight reach or the curved phase of the belt.

The nature of the linkage provides means whereby the coupler may be easily connected without the use of special tools. The hook and loop parts of the links provide an arrangement which completes the connection by merely anchoring the hooks and slipping the loops over the ends of the recessed members. A belt connecter of this type permits random lengths of stock material to be effectively used. At the present time, it is necessary to carry a large quantity of various types and sizes of endless belts to accommodate installation conditions. Our coupler permits belt stock to be cut to the desired length and effectively connected on the basis of actual need. Furthermore, we eliminate the necessity for shifting one or both parts of the drive or driven members.

Obviously any number of our connecter units may be employed for connecting the ends of a single belt. Such a connection might be advisable in cases where the belts are of more than ordinary width. It will also be understood that the connecter is applicable to belts other than of the V-type.

Without further elaboration the foregoing will so fully explain our invention that others may, by applying current knowledge, readily adapt the same for use under various conditions of service.

We claim:

1. In a transmission belt, a connecter comprising two links arranged in crossed relation, anchor members connected with the ends of the belt and operatively connected with said links, to connect the belt into a unitary whole, and abutment means in the nature of fulcrums anchored in the belt ends in a plane common to the neutral axis of the belt for receiving forces transmitted to the belt ends by the anchor means.

2. In a belt of the V-type, a connecter for operatively connecting the ends of said belt, each belt end having an opening therethrough arranged to bisect the angle between the converging sides of the belt, an anchor member positioned within each of said openings, each end of each anchor element being provided with a recess, a pair of links, each link having one end loosely positioned within the recess in one end of one of the anchor elements upon the same side of the belt, the opposite ends of the links being loosely connected within the recesses in the opposite ends of said anchor members on the opposite side of the belt, and bearing members anchored in the belt ends at an angle to said anchor members.

3. In a belt of the V-type, a connecter for operatively connecting the ends of said belt, each belt end having an opening therethrough, an anchor member positioned within each of said openings, each end of each anchor element being provided with a recess, and a pair of links, each link having one end loosely positioned within the recess in one end of one of the anchor elements upon the same side of the belt, the opposite ends of the links being loosely connected within the recesses in the opposite ends of said anchor members on the opposite side of the belt.

4. In a transmission belt, a connecter comprising two links arranged in crossed relation, one of said links having an opening for the reception of the other, and anchor members connected with the ends of the belt and operatively connected with said links, to connect the belt into a unitary whole, the anchor members associated with each end of the belt being arranged in converging relation with respect to each other and in parallel relation with respect to the anchor members in the opposite end when that portion of the belt is in its straight phase, said links being constructed and arranged to provide compensation for variations in the relative alignment between the anchor members associated with one end of the belt and the anchor members associated with the other end of the belt.

5. In a transmission belt, a coupler comprising two anchor elements constructed to be imbedded in the ends of a belt and having openings, and a plurality of links arranged in crossed relation and having hook means arranged to be inserted in said openings, to loosely connect the links with the anchor members.

6. In a power transmission belt, a connecter for connecting the ends of the belt, said connecter comprising rocker members passing through the ends of the belt, fulcrum members imbedded in the belt ends arranged in operative relation with said rocker members, and means operatively connecting said rocker members, to connect the belt into a unitary whole.

7. In a power transmission belt of the V-type, a connecter for joining the ends of the belt, said connecter comprising a link having means imbedded in the belt ends, and means imbedded in the belt ends in operative relation with said first-named means to provide pivotal anchorage for said first-named means, to connect the belt into a unitary whole.

8. In a transmission belt, a connecter comprising two links arranged in crossed relation, one of said links having an opening for the reception of the other, a pair of anchor members connected with each end of the belt, each link having two hooks at each end, and means carried by the anchor members for loose connection with the hooks of the links, to connect the belt into a unitary whole.

9. In a power transmission belt, anchor means fastened to the belt inwardly of its ends, and a connecter for connecting the ends of the belt, said connecter comprising reaches arranged in crossed relation and extending inwardly of the belt ends and movably connected with said anchor means.

10. In a power transmission belt of the V-type, a connecter for joining the ends of the belt, said connecter comprising two links each extending over opposite sides of the belt and being movable relatively to the same, and means anchored to the belt ends and loosely connected with said links inwardly of the belt ends.

11. In a power transmission belt of the V-shape, a connecter for joining the ends of the belt, said connecter comprising two links extending over opposite sides of the belt ends, and means loosely connected with said links inwardly of the belt ends and anchored to the belt, each belt end being provided with a groove in one side to house one end of one of said links.

12. In a power transmission belt of the V-type, a connecter for joining the ends of the belt, said connecter comprising a pair of crossed links each extending inwardly of the belt ends on opposite sides thereof, means imbedded in the belt inwardly of its ends and loosely connected with the ends of said links, said means extending through the belt and said links being movably related with respect to the latter.

13. In a transmission belt, a connecter comprising crossed links, and means loosely connected with the links inwardly of the belt ends and fastened to the belt for connecting the same into a unitary whole.

14. In a transmission belt, a connecter comprising two links arranged in crossed relation, one of said links being provided with an opening for the reception of the other, said links being arranged in movable overlapping relation with the belt ends, and means loosely connected with the ends of the links and fastened to the belt for connecting the same into a unitary whole.

15. In a transmission belt, an anchor element passing through each belt end at right angles to the belt in its straight phase, and two links arranged in crossed relation and extending in movable overlapping relation with the belt ends and loosely connected with said anchor elements.

16. In a transmission belt, an anchor element passing through each belt end at right angles to the belt in its straight phase, two endless links arranged in crossed relation and in movable overlapping relation with the belt ends, and a movable connection between the ends of the links and said anchor elements.

17. In a transmission belt of the V-type, a pair of anchoring elements imbedded in each end of the belt inwardly of its end, and a pair of crossed links, each link extending in overlapping and movable relation with opposite sides of the belt and having movable connections with each of said anchoring elements inwardly of the belt ends.

18. In a transmission belt, a pair of anchoring elements imbedded in each end of the belt inwardly of its end, and a pair of crossed links each having a pair of hooks at each end, said hooks being movably connected with said elements inwardly of the belt ends.

WARREN A. SHIPPERT.
EDWARD KELLY O'BRIEN.